Aug. 25, 1953     H. F. BROWN     2,649,680
FRUIT GATHERER APRON

Filed May 29, 1951     2 Sheets-Sheet 1

INVENTOR.
HUGH F. BROWN
BY
ATTORNEY

Aug. 25, 1953
H. F. BROWN
2,649,680
FRUIT GATHERER APRON
Filed May 29, 1951
2 Sheets-Sheet 2
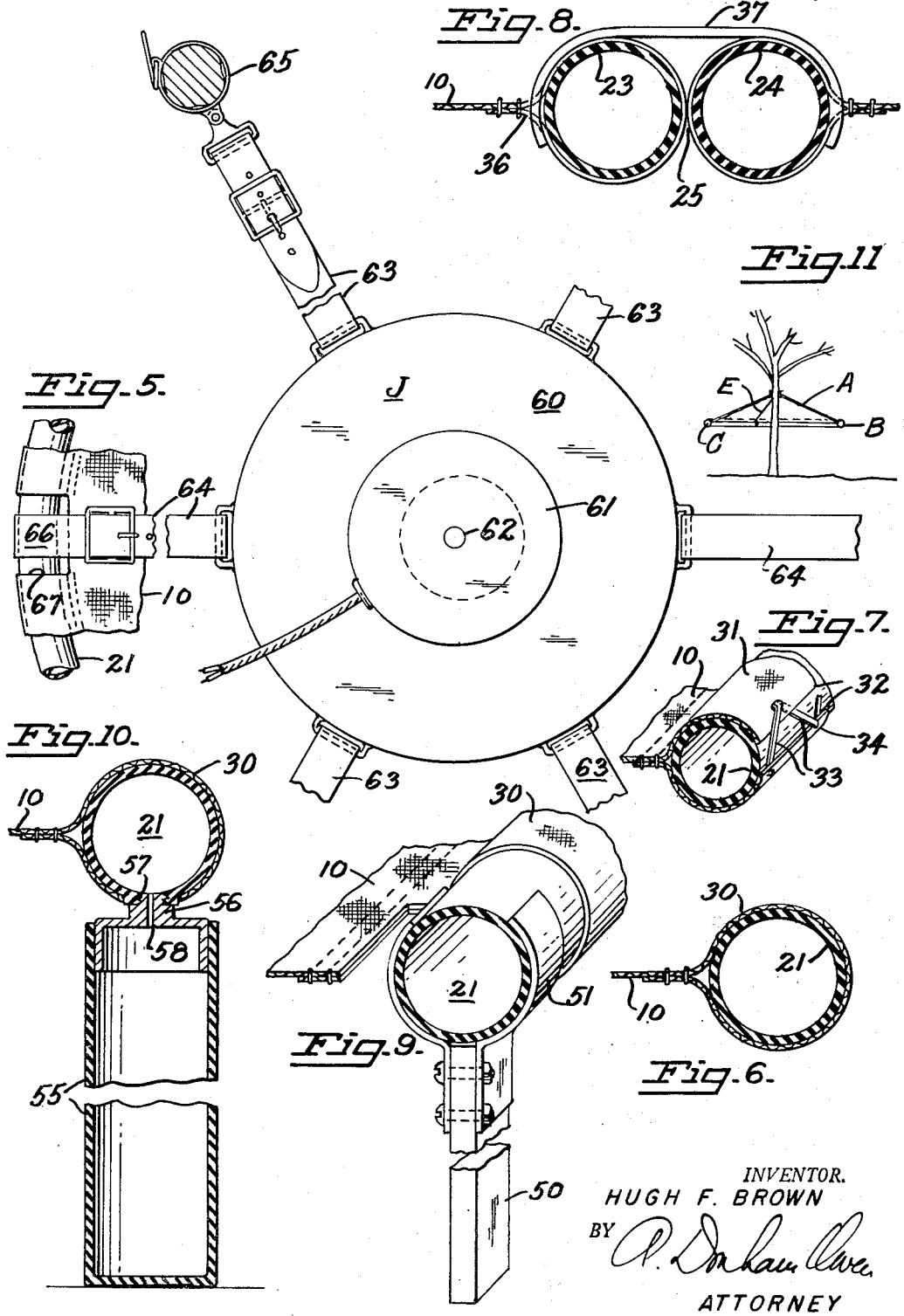
INVENTOR.
HUGH F. BROWN
BY
ATTORNEY Patented Aug. 25, 1953

2,649,680

UNITED STATES PATENT OFFICE 2,649,680

FRUIT GATHERER APRON

Hugh F. Brown, Oakland, Calif.

Application May 29, 1951, Serial No. 228,861

17 Claims. (Cl. 56—329)

This invention relates to improvements in fruit gatherers of the type in which an apron of cloth or similar material is supported beneath the branches of a tree, as well as to improvements in sheltering means.

Because of its novel structure, my invention speeds up all phases of the fruit gathering operation. The apron may be set in place more quickly, moved from tree to tree more easily, taken down more rapidly, and stored more conveniently than prior-art devices. When in place, my invention gathers the fruit from the tree more quickly than did prior-art devices, and it simplifies the packing by collecting the fruit at a single outlet. It also protects the fruit from getting bruised.

My invention solves at least five long-standing problems some of which had previously conflicted with each other, so that one could be solved only at the expense of adding other difficulties: (1) how to keep the outer periphery of the apron taut and level; (2) how to hold the body of the apron taut enough so that the fruit will roll down toward a central collection point where it may be rapidly withdrawn through an outlet opening; (3) how to keep the fruit moving until it reaches the outlet; (4) how to support the body of the apron with sufficient resiliency so that the falling fruit will not be bruised; and (5) how to simplify the moving of the apron from tree to tree and its installation at each tree.

In many prior-art fruit gatherers, ropes were used to hold the outer edge taut. In some cases one end of each of several ropes was fastened to the apron, and the opposite end was tied to other nearby trees. This always meant improvising, taking additional time, and it was difficult to get the apron properly in place. In other cases, a single rope was secured around the apron's outer periphery, usually inside a hem, and the rope was supported and stretched out by stakes driven into the ground at each tree. It took considerable time to drive the stakes and tighten the rope, and the rope was likely to stretch and sag afterwards. Moreover, between stakes, the apron sagged.

In some other prior-art fruit gatherers, the apron was held taut by a rigid metal rim secured in a hem around the apron's outer edge. Although the outer rim of the apron was thereby kept firm and at a uniform height, the body of the apron was not necessarily tautened. Attempts to support the apron by placing several reinforcing ribs radially, like spokes, met with failure, because the apron was likely to be stiffened until it lacked resiliency, so that the fruit falling thereon was likely to be bruised, especially if it struck one of the ribs. Also, the rigidity of the metal rim meant that it had to be made in two pieces in order to get it around the tree trunk, because it could not be bent into and out of shape; consequently, assembly and disassembly of the apron around each tree was time-consuming.

My invention solves the above problems by securing an inflatable tube in, or to the edge of a generally annular apron. When inflated, the tube expands into a firm but yieldable rim which becomes the radial supporting member for the apron. In other words, the inflated tube supports the apron around its rim just as if there were an infinite number of radial supporting connections to the apron. The vertical support of the radially supported apron may be by means of a few vertical legs, or by lines secured to the tree branches overhead. The inflated tube gives the apron a fine, resilient, shock-absorbing surface. Any desired degree of rigidity may be obtained by varying the air pressure in the tube. If desired, a continuation of this same tube or another separate tube may be secured around an inner rim and radially along the slit between the rims, forming a frame that completely shapes the apron.

The same structure, in combination with a single radial slit in the apron, makes it possible to spread apart the apron quickly when putting it around a tree trunk. If two radial slits are provided, thereby dividing the apron into two pieces, it may be easier to move from tree to tree.

In addition, my fruit gatherer may include a novel vibrating mechanism that shakes both the tree and the apron, so that the fruit is shaken off into the apron and is rolled toward an outlet tube at the low point.

Another use for the device of my invention is in a garden as a sunshade or shelter, or as a portable, easily erected housing in the field or in the woods. In this use, the apron is suspended high on a tree trunk or other vertically extending supporting member by securing its inner periphery around the support and the outer rim may or may not be tied down. It will drape down somewhat like an umbrella. For use on the beach, a telescoping or sectional pole may be used to provide the center support.

Further advantages and uses of the invention will suggest themselves from the following description of several embodiments, presented in

3 compliance with United States Revised Statutes, Section 4888. The description is illustrative and is not intended as a narrow limitation to structural details, the scope of the invention being stated in the appended claims.

In the drawings:

Fig. 5 is an enlarged top plan view of the vibrator, the straps and the power line for the motor being broken off to conserve space. One connection to a tree limb and one connection to the apron are shown.

Fig. 6 is an enlarged view in section taken along the line 6—6 of Fig. 2, showing the outer rim of the apron and the inflatable tube therein.

Fig. 7 is an isometric view in section of a modified form of the outer apron rim and the inflatable tube.

Fig. 8 is an enlarged view in section taken along the line 8—8 in Fig. 2, showing two inflatable tubes bracketed together along the radial slit that extends across one side of the apron.

Fig. 9 is an enlarged isometric view partly in section, taken along the line 9—9 in Fig. 2 and showing the connection of a rigid supporting leg to the inflatable rim tube.

Fig. 10 is a central vertical sectional view through a modified form of the connection of Fig. 9, where an inflatable leg is used.

Fig. 11 is a diagrammatic view showing the device in use as an overhead shelter.

My device includes a portable, generally annular apron or hopper A that encircles the tree trunk beneath the branches and catches the fruit that falls, particularly when the tree is shaken. The apron's outer rim B is resiliently supported and yieldably stiffened by an inflatable tube C, and the rim D at the opening near the center may be similarly supported and stiffened. A generally radial slit E runs between the rims B and D so that the apron A may be spread apart when placing it or when removing it from around the tree trunk, and the apron A may be stiffened along this slit E by one or more inflatable tubes like those in the rim B. The outer rim B rests on a plurality of legs or braces F, or it may be supported solely from the branches by a plurality of lines FF shown in dotted lines in Fig. 1. The apron A will assume a generally frusto-conical shape with the slope running in toward an annular trough G that surrounds the tree trunk. The fruit slides down the apron A into the trough G and is removed through an outlet tube H. I prefer to use a vibrator J for shaking both the tree and the apron A. The trough G may be separate from the apron A.

More specific forms of these various elements will now be described as illustrative embodiments of invention.

Figure 1:
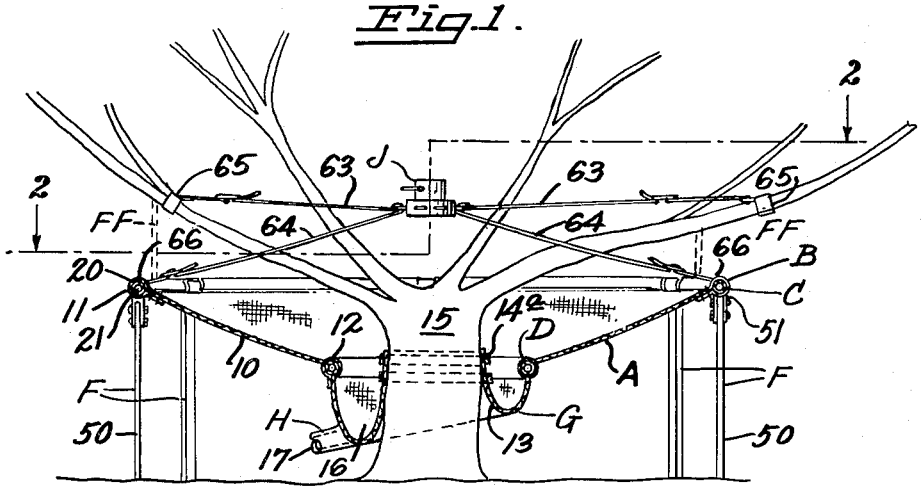
Fig. 1 is a view in elevation and partly in section taken along the line 1—1 of Fig. 2, showing a fruit gatherer embodying the principles of my invention, installed around a tree trunk and beneath the limbs.
Figure 2:
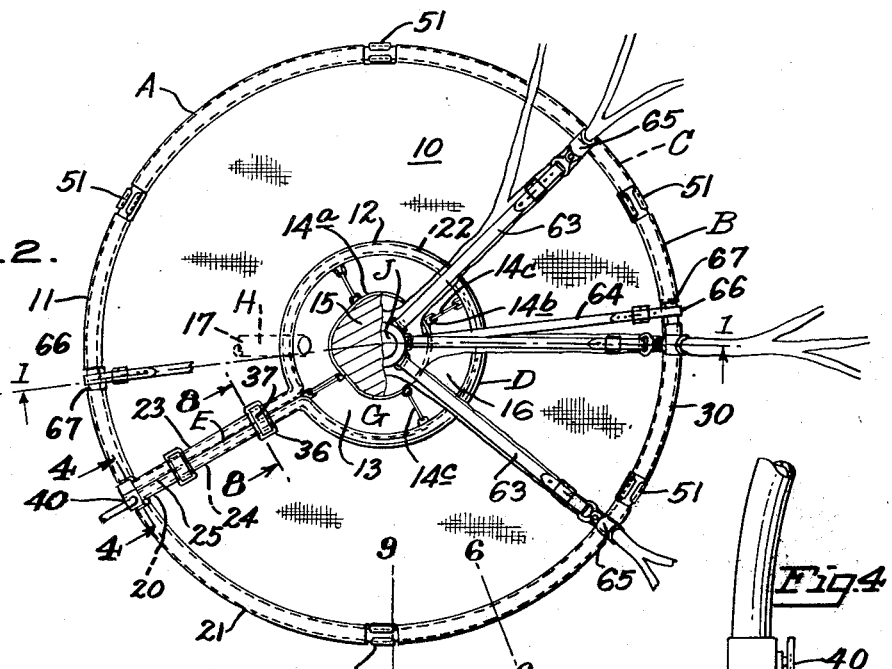
Fig. 2 is a plan view with parts broken away and shown in section, taken along the line 2—2 of Fig. 1.

Figs. 1 and 2 show one type of apron or hopper

4

10, preferably made of a sheet of canvas, plastic, net, or other material suitable to the crop being harvested. The apron 10 when in place, assumes a frusto-conical shape which slopes downwardly from its outer rim 11 to its inner rim 12, to which a trough 13, formed by a sagging slit annulus of fabric is secured. The inner rim 14 of the trough 13 may best be secured to the tree trunk 15 by a strap 14a having rings or eyelets 14b to which short connectors 14c may be secured to space the inner rim 12 in relation to the tree trunk. Preferably, the cloth trough is shaped so that its channel 16 will slope down toward an outlet tube 17, where the fruit may be removed. One way to make the trough slope toward the outlet is to cut the hole for the tree trunk off-center with respect to the trough's outer rim; then the wider portion of the trough will sag more deeply. The tube 17 should then be located at the widest portion.

Figures 3, 4:
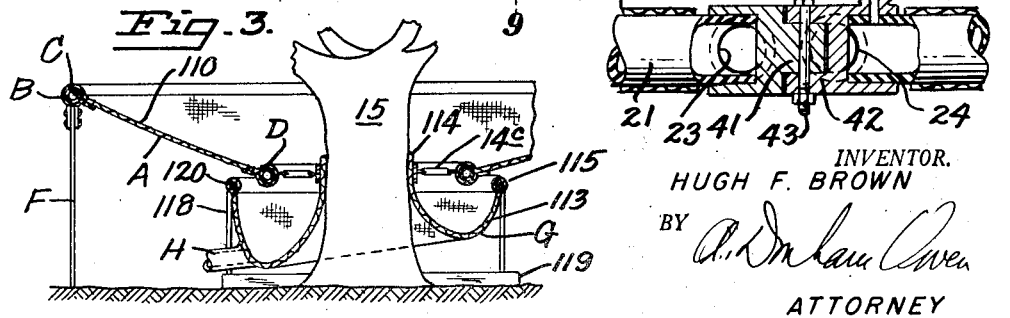
Fig. 3 is a partial central sectional view, similar to Fig. 1 but showing a portion of a modified form of the invention where the inner trough constitutes a member separate from the main apron or hopper.
Fig. 4 is an enlarged view partially in section taken along the line 4—4 in Fig. 2, showing the air inlet valve connection for the inflatable tube.

The trough G need not be secured to the apron A. In Fig. 3 the split trough 113 is completely separate from the apron 110 and its outer rim 115 is supported by a number of legs 118 based on a platform 119. If desired, the outer trough rim 115 may also be stiffened by an inflatable tube 120, to keep it erect and level. The inner edge 114 of the trough 113 is secured to the tree trunk 15, like the rim 14 of the trough 13. For speed of operation in moving from tree to tree the strap 14a should be useful.

Returning to Figs. 1 and 2, the apron rims 11 and 12 are shown stiffened by inflatable tubes. A single continuous tube 20 is shown having an outer rim supporting portion 21, an inner rim supporting portion 22, and two radial supporting portions 23 and 24 that border the slit 25 where the apron may be spread apart. Each of these sections 21, 22, 23, and 24 may be made as separate tubes. The tubes may be made from rubber or canvas-covered rubber or any other strong material, and it may be inflated to any desired pressure to give the degree of rigidity required.

There are several suitable ways of securing the tube portion 21 around the apron's outer periphery 11. Fig. 6 shows a closed hem 30, in which the tube portion 21 may be inserted. A tube made from hose stock usually is stiff enough to be forced in, but if made like tire inner tubes, it can be pulled through the hem before inflation. An alternative way of securing the tube in the hopper is shown in Fig. 7 where the hem 31 is slit at 32 along its outer periphery. When the tube section 21 is inserted, the hem 31 is closed by a lacing 33 threaded back and forth through the grommets 34. Similar hems may be provided at the inner rim 12 and along the slit 25. Any other practical means may be used for securing the air tube in the rims and along the slits.

The two inflated tube sections 23 and 24 secured along the slit 25 tend to hold the apron edges at the slit together because of their stiffness. To make sure that a heavy downpouring of fruit will not open a substantial gap, one or more clips 37 may be placed over the tube portions 23, 24 to bracket them together. (See Figs. 2 and 8.) Openings 36 through the canvas expose the tubes 23, 24 so that the clip 37 may be put directly over them.

Where the tubes in the rims and along the slits are connected to each other, a single valve connection 40 may be used (see Fig. 4), to introduce compressed air from a suitable source (not shown). The connection 40 may be conveniently located near the slit 25, where the tube's outer rim portion 21 and inner rim portion 22 connect with the radial portions 23, 24. A rigid connection across the slit 25 may be provided at the outer rim 11 by a two-piece socket 41, 42 held together by a bolt or pin 43. If separate tubes are used, in the rims and along the slit, each will have its own valve.

Various types of legs F may be used to support the outer edge of the apron 10 off the ground. The rigid leg 50 shown in Fig. 9 may be of wood or metal, and may be secured to the inflated tube 21 by a two-piece clamp 51. When the tube section 21 is deflated, the clamp 51 will be loose and the legs 50 may be removed from the tube section 21, or they may be left in place and be folded up along with the canvas 10. The air pressure in the tube is never so great but what the clamp 51 can be put on by momentarily flattening the tube to slip the tube inside the clamp.

A form of pneumatically inflated supporting leg 55 is shown in Fig. 10. The leg 55 may be connected with the tube section 21, if appropriate openings are provided in the canvas rim and in the tube 21. The leg 55, shown in Fig. 10, has a male coupling 56 that fits into a female coupling 57 in the tube portion 21. The air conduit 58 conducts air from the tube section 21 to each of the legs 55, so that they may all be inflated at once from air entering through the valve 40. Instead of legs, straps FF may be used to support the outside rim of the apron directly from the tree's branches.

Fig. 5 shows one form of vibration apparatus J. Inside a vibrator housing 60 there is an off-center weight 61, i. e., a heavy member mounted eccentrically on a shaft 62 so that it sets up vibrations when the shaft 62 is rotated by an electric motor, a pneumatic motor, or any other form of driving means. The vibration producing mechanism J is shown supported in the tree by means of a plurality of adjustable straps 63, secured at one end to the vibrator housing 60 and at the other end to the branches of the tree. To impart vibrations to the apron A, a plurality of straps 64 are connected between the apron 10 and the vibrator housing 60. Several of these connections are shown in Figs. 1 and 2, and an enlarged view of one of each type is shown in Fig. 5. The straps 63 that are connected to tree branches may have an adjustable end-clamp 65 that will fit tightly around different sized branches. The straps 64 may be secured to the inflated rim tube section 21 by a clamp 66 that hooks around the tube. There may be an opening 67 in the canvas to receive the clamp 66, or a hook type of clamp may be used that does not require an opening.

When the device is in storage, the tube is deflated and the apron 10 is folded into a compact bundle. If inflatable legs 55 are used, they also will be collapsed. At harvest time it may be brought to the field and partially inflated before putting it around the tree. The apron 10 is spread apart along the slit 25 and is passed around the tree trunk. Then the socket 41, 42 is joined, the bolt or pin 43 secured, and the clamps 37 placed over the tube section 23, 24. Then the tube 20 may be fully inflated, if it has not been previously. If the inflatable legs 55 are used, they will be inflated at the same time. If the rigid legs 50 are used, their clamps 51 may be put around the tube 20 either before or after it is fully inflated.

When moving the device from tree to tree, it is not necessary to deflate the tube 20 provided the clamps 37 are easily removable, for with two men it is possible to spread the apron 10 apart at the slit and carry it into position around the next tree trunk. With the apron 10 in place, the vibrator J is installed by securing at least two of its straps 63 to tree limbs, securing at least one and preferably two of the straps 64 to the inflated rim tube section 21, and then securing as many straps 63 as may be desired to the other tree limbs. When the straps 63, 64 are all tightened, the motor may be energized, and the off-center weight 61 will set up vibrations which are transmitted to the tree limbs and to the apron. The fruit is shaken from the branches into the canvas apron 10, and rolls down toward the trough 13. Any tendency of the fruit to remain on the apron 10 between the two concentrically inflated rims 11 and 12 is overcome by the vibrator's agitation. The fruit which falls into the sloping trough 13 then may be removed through the outlet tube 17.

It is not absolutely essential to have the tubes 23 and 24 in the hems at the slit in the hopper, as the edges at the slit may be secured with other fastening means, such as a zipper. Also, it is possible to have an operative structure in which the apron is made with a pair of slits set about 180° apart so that in moving from tree to tree each half of the apron is separate from the other half. In this type of unit, the whole inner trough that secures to the tree trunk would preferably be a part of one of the half apron units, so it could be put in place before the other half was brought up into position.

The foregoing description shows the great benefit to be achieved by my invention in comparison with prior devices, for the air tube support of the outer apron rim provides a flexible gently yielding apron surface free to give with each piece of fruit that strikes the surface. It also provides an even 360 degree support of the apron surface so that the apron surface does not gather or fold in certain areas and interfere with free-rolling of the fruit. It provides a resilient, bendable support for the apron rim which can be collapsed or contorted into whatever shape is necessary to get through narrow spaces in an orchard, and which upon release immediately rounds out to its full diameter to support the apron evenly at all points around the periphery. It provides an apron which can be handled with a minimum of labor and which can be set up and moved from tree to tree in a fraction of the time required with earlier devices.

While my invention has been described in connection with its use as a fruit gatherer, it has other uses as a gatherer covering any area onto which objects may be caused to fall at unpredictable times and points. Also, instead of suspending the apron so that the low point is at the apex, the low point may be at the base or outer rim 12 so that the fruit will run to the outer rim where it can be emptied into suitable containers. Also, instead of a round shaped apron A, it may be oval or some other shape.

Even though the principal description of my invention has been in connection with its use as a fruit gatherer, it may have other uses, for example, as a shelter.

I claim:

1. An apron, including in combination, an annular sloping apron having an outer periphery and an opening spaced inwardly from said outer periphery, said apron having a slit dividing the apron between said inner opening and its outer periphery, and an inflatable member secured around the outer periphery of said apron.

2. An apron, including in combination, an annular sloping apron having an outer periphery and an opening spaced inwardly from said outer periphery, said apron being provided with a slit dividing the apron between said inner opening and said outer periphery, an inflatable member secured around said outer periphery, and means to vibrate said apron connected to said inflatable member.

3. A fruit gatherer adapted to fit around a tree trunk and beneath the branches, including in combination an annular sloping apron having an outer periphery, an opening spaced inwardly therefrom, and a slit dividing the apron between said inner opening and said outer periphery, an inflatable member secured around said outer periphery, and a plurality of legs secured to said outer periphery for supporting said fruit gatherer.

4. The fruit gatherer of claim 3 in which there is means secured to branches of said tree and to said apron for vibrating said tree and said apron.

5. The device of claim 4 in which the vibrator comprises a housing, a rotating shaft in said housing, a weight secured off center on said shaft, means for rotating said shaft, and a plurality of straps secured to said housing, so that some of said straps may be secured to limbs of said tree and some of said straps may be secured to said inflatable member, whereby the rotating off-center weight will vibrate said tree and said apron.

6. The apron of claim 1 in which there is an annular trough adapted to be secured around a tree trunk and to lie generally between said trunk and the inner periphery of the opening in said apron, said trough sloping toward an outlet tube where the fruit may be collected.

7. The device of claim 6 in which the outer periphery of the trough is secured to the periphery of the opening in said apron.

8. The device of claim 6 in which the outer periphery of said trough is separately supported with its outer edge extending radially beyond the inner periphery of the opening in said apron.

9. The fruit gatherer of claim 3 in which the legs are secured directly to said inflatable tube.

10. The device of claim 9 in which the legs themselves are inflatable and are joined by an air conduit to said inflatable tube so that said tube and said legs are inflatable as one.

11. The device of claim 9 in which the legs are rigid members having on one end a two-piece clamp that may be secured around said tube.

12. A fruit gatherer adapted to be placed around a tree trunk and beneath the branches to collect the fruit falling therefrom, comprising an annular, generally frusto-conical apron having an outer periphery, an opening near its center, and a slit running between said opening and said outer periphery, and an inflatable tube bordering said opening and said outer periphery and the edge of said slit.

13. The fruit gatherer of claim 12 in which said tube is secured to the apron by means of hems provided around said inner opening, around said outer periphery and along the edge of said slit.

14. The device of claim 13 in which said hem is split, and in which there are means for holding said hem together so that said tube is secured in place therein.

15. A fruit gatherer adapted to fit around a tree trunk beneath the tree limbs including in combination: an annular, generally frusto-conical hopper having inner and outer rims and having a slit running between said rims; having hemmed edges at both inner and outer rims and along said slit, inflatable pneumatic tube means secured inside the hems and running around said inner and outer rims and along each side of the slit; legs secured to said tube at intervals around the outer rim; and a generally annular, sagging, fabric trough having an outlet opening therethrough and secured to the inner rim of said hopper and sloping toward said outlet opening.

16. A fruit gatherer adapted to fit around a tree trunk beneath the tree limbs including in combination an annular, generally frusto-conical, apron having inner and outer rims and a radial slit running between its rims, said apron having its rims and the edges of said slit hemmed; inflatable tube means secured inside said hems around the inner and outer rims of said hopper and along each side of said slit; legs secured to said tube at intervals around the outer rim; an annular sagging fabric trough having an outlet opening therethrough, said trough being secured to the inner rim of said apron and sloping toward said outlet opening for the harvested fruit; and a vibrator having a housing and a plurality of straps secured thereto, some of said straps being secured to the limbs of the fruit tree, and at least one of said straps being attached tautly to said hopper.

17. In a collecting device adapted to cover an area onto which objects may be caused to fall at unpredictable times and points, the combination of a generally circular receiving means of resilient material having an outer rim; an inflated tubular member secured near the outer rim of said receiving means; and means for supporting said device so that the receiving means is free to give and the inflated tubular member is free to provide a yielding support for said receiving means.

HUGH F. BROWN.

References Cited in the file of this patent
UNITED STATES PATENTS

| Number | Name | Date |
|---|---|---|
| 42,387 | Maxfield | Apr. 19, 1864 |
| 219,080 | Edwards | Sept. 2, 1879 |
| 606,682 | Pearce | July 5, 1898 |
| 732,838 | Edwards | July 7, 1903 |
| 1,323,329 | Snyder | Dec. 2, 1919 |
| 1,385,111 | Byman | July 19, 1921 |
| 2,198,148 | Baily | Apr. 23, 1940 |

FOREIGN PATENTS

| Number | Country | Date |
|---|---|---|
| 373,917 | France | Mar. 29, 1907 |